United States Patent

Fisher et al.

[15] 3,706,850

[45] Dec. 19, 1972

[54] TELEWRITING SYSTEM

[72] Inventors: George Myles Cordell Fisher, Holmdel; Fritz Edgar Froehlich, New Shrewsbury; William Levin, Freehold; Colonel Blake McDowell, III, Holmdel; Leonard Edward O'-Boyle, New Shrewsbury, all of N.J.

[73] Assignee: Bell Telephone Laboratories, Incorporated, Murray Hill, Berkeley Heights, N.J.

[22] Filed: April 23, 1971

[21] Appl. No.: 136,736

[52] U.S. Cl. ....................178/18

[51] Int. Cl. ....................G08c 21/00

[58] Field of Search ........179/2 DP, 2 TV; 178/18, 5, 178/19, 20, 15, 17 D, 25, 30; 340/365, 146.3 SY; 235/61; 346/17, 76, 108; 350/119, 154

[56] References Cited

UNITED STATES PATENTS

| | | | |
|---|---|---|---|
| 3,457,371 | 7/1969 | Sharon | 179/2 DP |
| 3,156,766 | 11/1964 | Stamps | 178/18 |
| 2,918,343 | 12/1959 | Guillot | 346/17 |
| 3,448,458 | 6/1969 | Carlson et al. | 346/17 |
| 3,220,012 | 11/1965 | Schwertz | 346/17 |
| 3,579,186 | 5/1971 | Johnson | 340/196.3 SY |

*Primary Examiner*—Kathleen H. Claffy
*Assistant Examiner*—K. Richardson
*Attorney*—R. J. Guenther and Edwin B. Cave

[57] ABSTRACT

A telewriting system for transmitting handwriting and similar data in real time over voice grade telephone lines and reproducing such data at remote locations utilizes digital transmission to reduce the effects of transmission noise and signal distortion and to provide an easy means for control of remote apparatus. An ultrasonic transducer and microphone combination provides a readout of the writing head position with respect to a writing surface such as a blackboard. The readout signal is converted into digital form and transmitted to the remote locations where it is reconverted to analog form. The analog signal is used to control the deflection of an ultraviolet laser which reproduces the data on a photosensitive plate while the plate is simultaneously projected by visible light. The analog signal can also control other types of utilization apparatus.

9 Claims, 5 Drawing Figures

INVENTORS G. M. C. FISHER
F. E. FROEHLICH
W. LEVIN
C. B. MCDOWELL, III
L. E. O'BOYLE

BY [signature]
ATTORNEY

TELEWRITING SYSTEM

BACKGROUND OF THE INVENTION

1. Field of the Invention

This invention relates to transmission of data such as handwriting or graphics from one station and reproducing such data at remote locations. More particularly it relates to a telewriting system which transmits data in digital form and utilizes a laser to reproduce the data at the remote locations.

2. Description of the Prior Art

There exist many types of systems variously known as telescribing, electrographic, telautographic and facsimile systems for transmitting data such as handwriting from one station and reproducing such data at remote stations. These systems utilize many types of apparatus fro converting the data into electrical signals as the data is generated at the originating station. These types of apparatus include mechanical linkages, conductive surfaces, deflective membranes, and light detector arrangements. The signals produced by these apparatus or signal generators are normally transmitted to the remote locations in analog form where they are used to drive reproduction apparatus to reproduce the data. The reproduction apparatus is normally a duplicate of the signal generating apparatus with the output and inputs reversed.

A major limitation of these prior telewriting systems utilizing analog transmission is the distortion introduced by voice-grade telephone lines over which it is normally desirable to transmit the data because of economic considerations. This distortion results from such factors as line noise and frequency shifts because of imperfect modulation and demodulation in the transmission system. For many systems only a relatively small percentage, perhaps 25 percent or less, of the voice-grade telephone circuits have sufficiently low distortion and noise to provide faithful reproduction of the transmitted data at the remote locations. Another limitation of existing systems includes signal degradation in the graphical input terminal because of the signals being in analog form. A further limitation is the restricted size and relative cost of the input format. A still further limitation is the poor contrast provided by the reproduced format which restricts its use as a projection system.

Accordingly, it is an object of this invention to provide an improved telewriting system which can be used with normal voice-grade telephone lines.

Another object is to improve telewriting systems to provide increased flexibility with respect to the size of the input format.

Still another object is to improve telewriting systems to provide increased flexibility with respect to the utilization of the reproduced data at remote locations.

SUMMARY OF THE INVENTION

The foregoing objects and others are achieved in accordance with the principles of this invention by a telewriting system which transmits data in digital form and which utilizes a laser to reproduce the data on a photo-sensitive or heat sensitive plate while the plate is simultaneously projected onto a viewing surface. An ultrasonic transducer and microphone combination produces a signal which is responsive to the location of the writing head which is producing the data with respect to the writing surface on which the data is being produced. This signal is converted to digital form and transmitted to the remote locations on voice-grade telephone circuits where it is reconverted to analog form. The analog signal is then used to deflect a laser which reproduces the data on a photo-sensitive or heat sensitive surface while the surface is simultaneously projected onto a viewing surface with light from a different part of the spectrum than that of the laser. The analog signal can also be utilized in other apparatus at the remote locations.

DESCRIPTION OF THE DRAWING

The invention will be more fully comprehended from the following detailed description and accompanying drawing in which.

DETAILED DESCRIPTION

Figure 1:
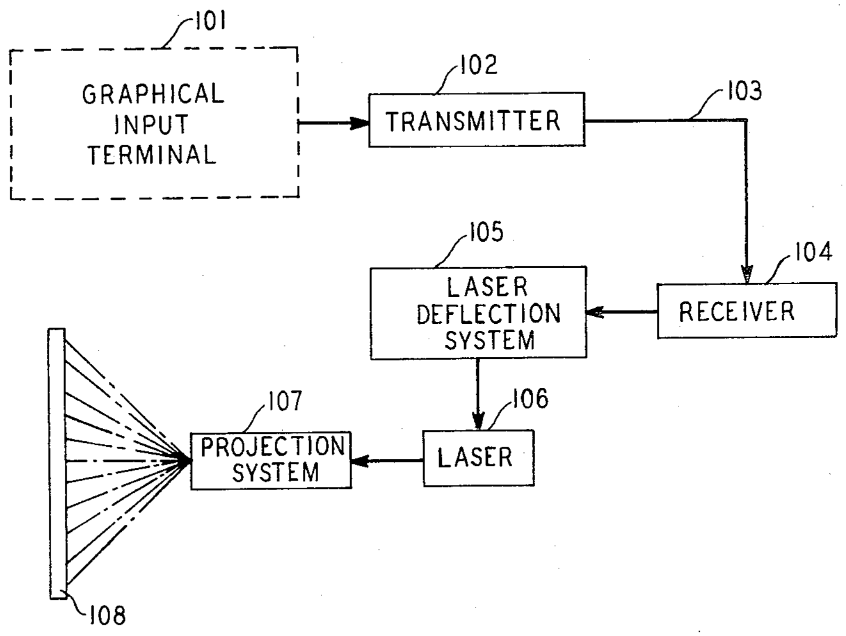
FIG. 1 is a schematic block diagram of the telewriting system of this invention.

Referring now to FIG. 1 there is shown a block diagram representation of a telewriting system in accordance with the principles of this invention. At the originating location where the data is initially generated there is located a graphical input terminal 101 and a transmitter 102. Graphical input terminal 101 generates electrical signals responsive to the data being produced and converts these signals into digital form. The transmitter 102 then inserts the digital data on a voice-grade telephone line 103 for transmission to remote locations. Graphical input terminal 101 can comprise apparatus known in the art. An example of a commercially available unit which can be used is the unit sold under the trademark GRAF/PEN by Science Accessories Corporation, Southport, Conn.

Figure 2:
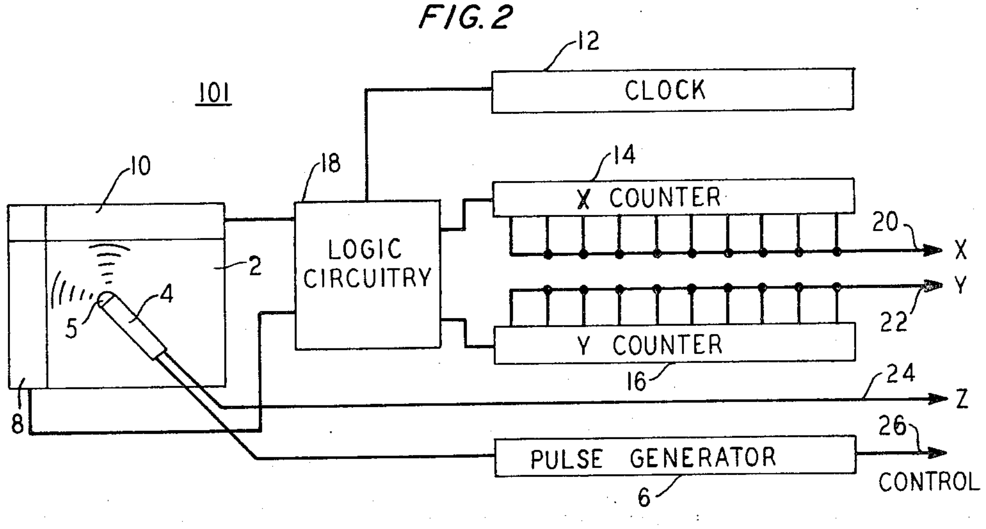
FIG. 2 is a more detailed schematic representation of the graphical input terminal or signal generator shown in FIG. 1.

As shown in FIG. 2, the data such as handwriting or graphics is produced on a writing surface 2 such as a blackboard or similar surface. The data is written on surface 2 by a stylus 4 which includes a writing tip 5 of chalk or the like. Stylus 4 is connected to a pulse generator 6 which causes stylus 4 to produce repetitive ultrasonic pulse outputs. The ultrasonic pulses can be produced by a high voltage sparking between two closely spaced electrodes on stylus 4. Stylus 4 also includes an internal switch which indicates whether or not the writing tip 5 is in contact with writing surface 2. Such a switch can comprise one of many well known types of contact responsive switches.

Along mutually perpendicular edges of surface 2 are mounted two strip microphones 8 and 10 which are responsive to the ultrasonic pulses produced by stylus 4. Microphones 8 and 10, in conjunction with clock 12, counters 14 and 16, and logic circuitry 18, measure the time delay for airborne propagation between the radiation of a pulse at stylus 4 and its arrival at the respective microphones. Logic circuitry 18 can comprise circuits well known in the art for combining the outputs from microphones 8 and 10, pulse generator 6 and clock 12 to control counters 14 and 16 which count or measure the time delays. Counters 14 and 16 also comprise known electrical circuits. The measured time delays establish the coordinates of the location of writing tip 5 on writing surface 2 at the time of any particular pulse output.

Counters 14 and 16 produce pulses or digital outputs which are representative of the time delays and therefore representative of the location coordinates of writing tip 5. For example, counter 14 could produce a ten bit output representative of x-coordinate location and counter 16 could produce a 10 bit output representative of a y-coordinate location. These $x$ and $y$ coordinates together would define 1.024 possible distinct locations in each direction on surface 2. The rate of pulse generation by stylus 4 and the number of digits produced by counters 14 and 16 will depend upon the desired position resolution and the rate at which stylus 4 moves with respect to surface 2. The outputs from counters 14 and 16 and the output from the internal switch of stylus 4, indicating whether or not tip 5 is in contact with surface 2, are connected to transmitter 102 by connections 20, 22, and 24, respectively. The output from the internal switch of stylus 4 can be considered as a z-coordinate and can comprise a single bit. Pulse generator 6 is also connected to transmitter 102 by connection 26.

As previously mentioned, the number of bits in the $x$ and $y$ coordinates will vary depending upon the characteristics of the particular graphical input terminal and the desired accuracy. In a specific embodiment 10 bits can advantageously be utilized for both $x$ and $y$ coordinate representations. One additional bit is required for the z-coordinate. Thus, 21 location bits could specify precisely where stylus 4 is located with respect to surface 2. However, in addition to the location bits some method is required to determine where a particular string of bits is to be subdivided into words when the string arrives at the remote locations. This can be accomplished by using an additional bit, the twenty-second bit, for synchronization. Thus, a complete 22 bit word in the telewriting system can be depicted as:

$x_1x_2x_3 \ldots x_9x_{10}y_1y_2y_3 \ldots y_9y_{10}zs$ where $x_1$ = the least significant bit of the x-coordinate location, etc.;

$y_1$ = the least significant bit of the y-coordinate location, etc.;

$z$ = the z-coordinate bit; and $s$ = the synchronization bit.

Whether a particular twenty-two bit word comprises a location word or a synchronization word will depend in part upon the value of the $s$ bit. The $s$ bit can be designated as "1" for all location words and "0" for all synchronization words as will be subsequently explained more fully. The $z$ bit can be designated as "0" when the writing tip 5 is in contact with surface 2 and "1" when tip 5 is not in contact with surface 2.

Figure 3:
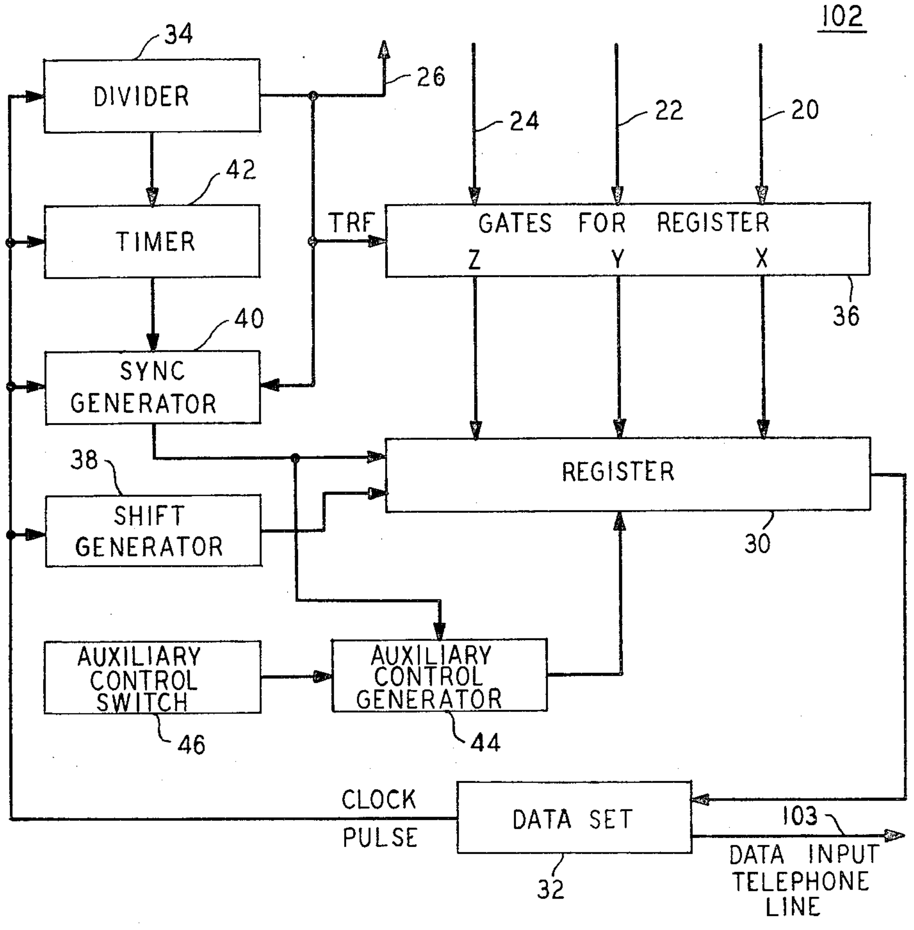
FIG. 3 is a more detailed schematic representation of the transmitter shown in FIG. 1.

As shown in FIG. 3 transmitter 102 comprises a register 30 for organizing and processing the digital data from graphical input terminal 101 and a data set 32 for inserting the processed data onto a telephone or transmission line 103 in the proper frequency bands and at the proper levels. Data set 32 can comprise a commercially available data set which includes a timing clock that can be utilized to control transmitter 102. The clock pulses from data set 32 are connected to a divider 34 which produces an output when the number of clock pulses received equals the number of bits in a telewriting system word. In the illustrative embodiment, divider 34 would produce an output after each group of 22 clock pulses has been received. Each output from divider 34 is connected to pulse generator 6 of graphical input terminal 101 and causes generator 6 to produce the previously described ultrasonic pulse output from stylus 4. The output from divider 34 is also connected to gates 36 to which inputs 20, 22, and 24 from graphical input terminal 101 are also connected. The output from divider 34 triggers gates 36 and moves the data on connections 20, 22, and 24 into respective positions in register 30. The clock pulses from data set 32 are also connected to shift generator 38. The output of generator 38 is connected to register 30 and controls the movement of data from register 30 to data set 32.

A previously mentioned, synchronization words are utilized at the remote locations to determine where a particular string of received data bits should be divided into words. The twenty-second bit or $s$ bit in a location word is designated as a "1" whereas the $s$ bit is designated as a "0" in a synchronization word. Further all other bits in the synchronization word are designated as "1" so that these words can be easily detected in the telewriting system. The synchronization words are produced by a synchronization generator 40 and shifted into register 30 at specified intervals determined by a timer 42. Timer 42 and synchronization generator 40 are controlled by divider 34 to ensure that the synchronization word is inserted between location words rather than in the middle of a location word. The intervals between synchronization words can be varied depending upon the quality of telephone line 103 and the resulting likelihood of loss of data bits during transmission.

The synchronization word in slightly modified form can also be used as a control word to automatically control auxiliary equipment such as projectors, recorders, etc., at the remote locations. For example, a specified bit or small group of bits within a synchronization word can be designated as "0" which would distinguish such word from both the previously discussed location word and the normal synchronization word. These control words are generated by the output of synchronization generator 40 triggering an auxiliary control generator 44 whenever an auxiliary control switch 46 is enabled by the transmitting operator. The resulting control words are fed into register 30 and transmitted by data set 32 in the same manner as synchronization words.

Figure 4:
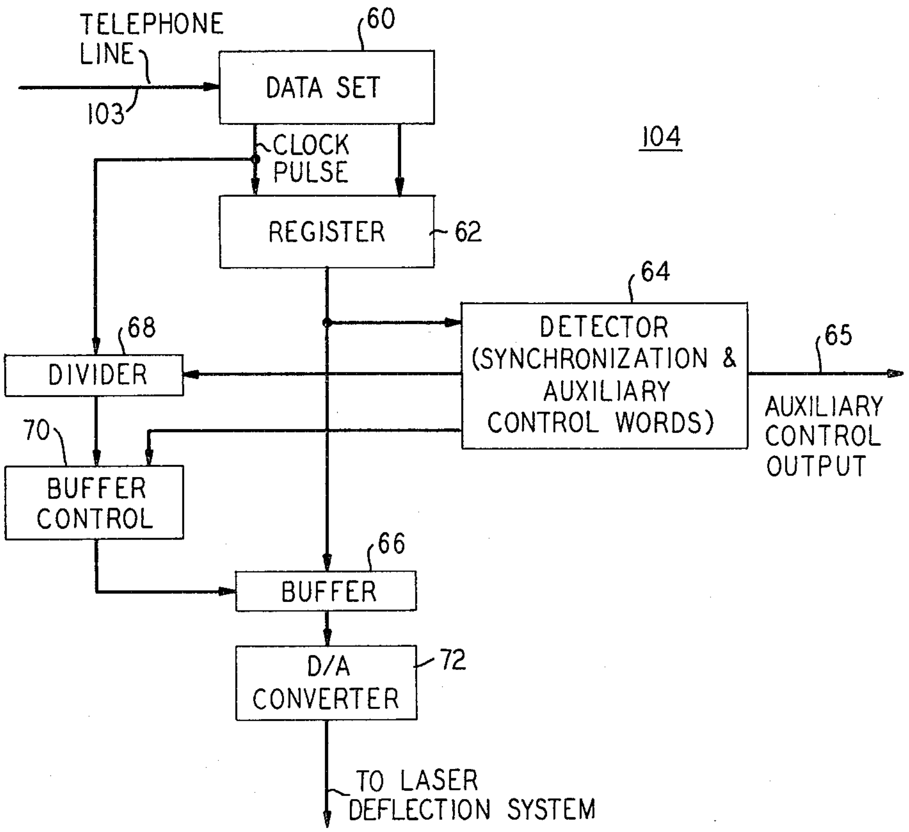
FIG. 4 is a detailed schematic representation of the receiver of FIG. 1.

After the digital information representing the path being followed by stylus 4 has been processed through register 30 it is placed at the correct levels and in the correct frequency band by data set 32 and transmitted on normal voice-grade telephone lines 103 to the remote locations. The relatively narrow voice band utilized on telephone line 103 is sufficient for transmitting this data because, unlike a scanned video system, only the minimum amounts of data required for describing stylus position at any given time are being transmitted. At the remote locations, line 103 is terminated in a receiver 104 which, as shown in FIG. 4, includes another data set 60 that also can comprise a commercially available set having an internal clock to control the operation of receiver 104. Clock pulses from the internal clock are connected to a divider 68 which determines where the received string of data bits is to be subdivided into words. In the illustrative embodiment the data string is divided into 22 bit words. Divider 68 controls buffer control 70 which monitors the movement of bits grouped as words for further processing.

Data set 60 receives the data in digital form from telephone line 103 and places them at the proper levels for further processing by register 62 which is controlled by clock pulses from data set 60. The output from register 62 is connected to a detector 64 and a buffer 66. A data string coming into register 62 is normally grouped or divided into words and transferred to a digital-to-analog (D/A) converter 72 through buffer 66. Detector 64 continually monitors the output from register 62 for bit groups which comprise synchronization words or auxiliary control words. Whenever a synchronization word is detected, detector 64 produces an output which resets or zeros divider 68 to ensure that the data string is being divided into words at the correct locations. Detector 64 also controls buffer control 70 to prevent the loading of the synchronization word into buffer 66. Whenever an auxiliary control word is detected, detector 64 provides an output to buffer control 70 which prevents the auxiliary control word from being loaded into buffer 66. Detector 64 also produces another output on connection 65 which controls the particular auxiliary equipment to which the auxiliary control word relates.

Data bits representing location words are loaded into buffer 66 by buffer control 70 when they have been properly grouped and then transferred to D/A converter 72 where they are reconverted into analog signals representative of the location coordinates of stylus 4 on surface 2. The analog signals are fed to a laser deflection system 105 which deflects the beam of a laser 106 which is used to recreate or reproduce the data. Laser deflection system 105 can comprise galvanometer mirrors known in the art. Laser 106 advantageously can comprise an ultraviolet laser known in the art.

Figure 5:
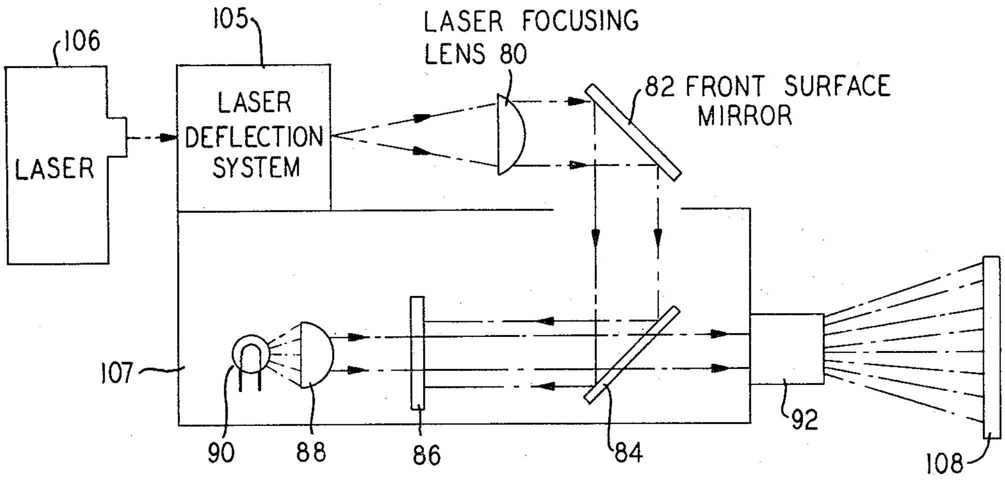
FIG. 5 is a detailed schematic representation of the projection system of FIG. 1.

As shown in FIG. 1 and 5, the deflected beam from laser 106 passes through lens 80 which focuses the light, after reflection off mirrors 82 and 84, onto a writing surface 86 such as a photographic plate or film. Mirror 84 advantageously can comprise a dichroic mirror which reflects ultraviolet radiation but transmits radiation in the visible spectrum. Writing surface 86 contains a light sensitive emulsion which is developed as the laser beam is deflected upon it to trace out a path which is a reproduction of the path of stylus 4 along surface 2. In the illustrative embodiment writing surface 86 will have an ultraviolet sensitive emulsion. Surface 86 could also comprise a heat sensitive emulsion which is developed by the deflected laser beam.

On the opposite side of writing surface 86 is a projecter comprising a condenser lens 88 and a lamp 90 which produces visible light to which film 86 does not react. Lamp 90 through lens 88 projects surface 86 at the same time that laser 106 is writing thereon. Surface 86 is projected through mirror 84 into a lens 92 which focuses the projection onto a viewing surface 108. The mirror and lenses used in the projection system are items known in the art.

By simultaneously writing or reproducing the data on surface 86 and projecting the surface, both a permanent record and a visual readout can be obtained. If other types of records are desired, the auxiliary control signals previously mentioned can provide for such records. For example, the remote location might include a computer which can be accessed directly by use of an auxiliary control signal generated at the originating station so that the data can be stored in or processed by the computer. Further the received data can be recorded at various points within receiver 104 and subsequently played back through the projection system.

The telewriting system has been described with reference only to the transmission of data such as handwriting and graphics. If such system is to be used as a remote lecture system it advantageously can be used with a commercially available voice transmission telephone set to provide full lecture services. The voice transmission set requires a separate telephone line. Alternatively, transmission of both voice and handwriting data over a single line could be accomplished by the use of switching apparatus to switch between the voice part and the graphical data part of the lecture.

The telewriting system can be utilized in a conferencing configuration when the writing or production of data and the display or reproduction of the data is accomplished on the same surface.

While the invention has been described with reference to a specific embodiment thereof it is to be understood that various modifications thereto may be made by those skilled in the art without departing from the spirit and scope thereof.

What is claimed is:

1. A telewriting system for transmitting information such as handwriting and graphics from an originating station to remote stations and reproducing said information at said remote stations comprising, in combination:

a graphical input terminal including a stylus, a first writing surface upon which said stylus produces said information, and means for producing digital signals representative of the location of said stylus with respect to said surface;

a transmitter for transmitting said digital signals along a transmission line so that said signals are substantially immune from signal distortions and noise introduced by said line, said transmitter including a first signal generator for generating synchronization signals to control the division of said digital signals into data words representative of said location of said stylus at any specified time, and timing means for controlling the insertion of said synchronization signals between said digital signals;

a receiver at said remote stations for taking said digital signals from said transmission line and reconverting said digital signals into analog signals;

a laser for writing upon a second writing surface;

means responsive to said analog signals for deflecting said laser about said second writing surface so as to reproduce said information thereon at said remote stations; and a projector for projecting said second writing surface onto a viewing surface simultaneous with the reproduction of said information thereon.

2. Apparatus in accordance with claim 1 including a second signal generator for generating control signals for controlling the operation of auxiliary equipment at said remote locations, said timing means controlling the insertion of said control signals between said digital signals.

3. Apparatus in accordance with claim 2 wherein said transmitter and said receiver, respectively, include first and second data sets for inserting said digital, said synchronization, and said control signals on said transmission line in a preselected frequency band and at a preselected level at said originating station and for removing said signals from said line at said remote stations, respectively.

4. Apparatus in accordance with claim 1 wherein said transmitter includes register means for storing said digital signals from said graphical input terminal:

a data set for linking said register means to said transmission line, said data set including a source of timing pulses; and means for using said timing pulses to control the movement of said digital signals from said input terminal to said register means and from said register means to said data set.

5. Apparatus in accordance with claim 1 wherein said receiver includes register means for storing said digital signals from said transmission line:

a data set for linking said register means to said transmission line;

detection means for detecting said synchronization and said control signals;

digital to analog converter means for converting said digital signals to analog signals indicative of said location of said stylus; and means responsive to said detection means for controlling the movement of said digital signals from said register means to said digital to analog converter means.

6. Apparatus in accordance with claim 1 wherein said second writing surface is responsive to radiation in a specified frequency band, said laser generating radiation within said band, and said projector includes a source of radiation outside said frequency band whereby said second surface can be projected without affecting said information thereon.

7. A telewriting system for transmitting information such as handwriting and graphics from an originating station to remote stations and reproducing said information at said remote stations comprising, in combination:

a graphical input terminal including a stylus, a first writing surface upon which said stylus produces said information, and means for producing digital signals representative of the location of said stylus with respect to said surface;

a transmitter for transmitting said digital signals along a transmission line so that said signals are substantially immune from signal distortions and noise introduced by said line, said transmitter including means for inserting synchronization signals and control signals at preselected locations between said digital signals, said synchronization signals designating the locations at which said digital signals are divided into data words representing said location of said stylus at a specified time, said control signals controlling the operation of auxiliary equipment at said remote locations;

a receiver at said remote stations for taking said digital signals from said transmission line and reconverting said digital signals into analog signals, said receiver including a detector for detecting said synchronization and said control signals;

a laser for writing upon a second writing surface;

means responsive to said analog signals for deflecting said laser about said second writing surface so as to reproduce said information thereon at said remote stations; and a projector for projecting said second writing surface onto a viewing surface simultaneous with the reproduction of said information thereon.

8. Apparatus in accordance with claim 7 wherein said receiver includes a register for dividing said digital signals into data words and a converter for converting said digital data words to analog signals, said detector controlling the grouping of said digital signals into data words by said register in response to said synchronization signals.

9. A telewriting system for transmitting information such as writing and graphics from a first location and reproducing said information at a second location comprising, in combination:

an input terminal at said first location including a first recording means on which said information is produced, and means for producing digital signals representative of said information;

a transmitter for transmitting said digital signals along a transmission line including means for inserting synchronization and control signals at preselected locations between said digital signals, said synchronization signals designating the locations at which said digital signals are divided into data words representing segments of said information, said control signals controlling apparatus at said second location, and a data set for inserting said digital, synchronization and control signals on said transmission line;

a receiver at said second location for receiving said signals from said transmission line including a detector for detecting said synchronization and control signals, and means responsive to said detector for converting said digital signals into analog signals representative of said information;

a beam of radiation;

a second recording means responsive to said beam;

means responsive to said analog signals for deflecting said beam about said second recording means so as to reproduce said information thereon; and means for projecting said second recording means onto a viewing surface thereby to display said information.

* * * * *